Patented Apr. 14, 1931

1,800,477

UNITED STATES PATENT OFFICE

WILLIAM KENMORE SCHWEITZER, OF CLEVELAND, OHIO, ASSIGNOR TO THE GRASSELLI CHEMICAL COMPANY, OF CLEVELAND, OHIO, A CORPORATION OF DELAWARE

ZINC CHLORIDE BASE FLUX

No Drawing.  Application filed December 26, 1929.  Serial No. 416,758.

Zinc chloride alone, as well as in admixture with various compounds, such as hydrochloric acid, ammonium chloride, fusel oil, and in aqueous and dilute alcoholic solutions forms the base of most soldering fluxes used in soft soldering of metals. The use of these fluxes requires clean metals, free from grease, oil, dirt, etc., as otherwise the flux is unable to penetrate to the metal itself.

I have found that the addition of relatively small amounts of certain esters to zinc chloride base fluxes improves their properties in that the compounded fluxes are able to "cut through" the grease or oil film on metal articles and my invention comprises the novel compounded fluxes as well as their use in soft soldering. The type of esters useful in my invention are the esters from aliphatic alcohols and volatile acids. They are in general clear liquids of sometimes pleasant odor and usually liquid at ordinary temperatures.

I have added to zinc chloride fluxes various esters of the class specified above, both of low boiling alcohols with high or low boiling acids, and of high boiling alcohols with low boiling acids and have found that this addition has generally improved the property of the fluxes to cut through oil films. The compounded fluxes have also to a certain, though not a very pronounced extent, the property of greater spread than the flux without the ester.

The following are some of the esters added by me to zinc chloride base fluxes in proportions varying from ¼ to 10% by weight of the flux: ethyl acetate, butyl acetate, vinylacetate, amyl acetate, ethyl propionate, ethyl butyrate, ethyl caproate, ethyl benzoate, ethyl phthalate, isoamyl phthalate. The compounded fluxes all showed an improvement over the straight fluxes. Outstanding amongst these esters seems to be amylacetate, which added in an amount from 1 to 2 per cent to a zinc chloride base flux of the following composition:

|   | Parts by weight |
|---|---|
| Zinc chloride, 70% solution | 350 |
| Hydrochloric acid 20° Bé | 350 |
| Denatured alcohol | 100 |
| Ammonium chloride | 25 |
| Water | 175 | produces a flux which readily cuts through oil and grease films present on metal articles to be soldered. Addition of larger amounts of amylacetate, for instance, from 5 to 10%, produces fluxes which have similarly the property of cutting through oil, but they also have a better spread.

Compositions of zinc chloride base fluxes can be varied within wide limits, such various combinations being required to perform efficiently under the very different conditions obtaining in soft soldering work. I have tested soldering fluxes of a variety of compositions with or without the addition of a few percent of an ester and found generally that the zinc chloride base fluxes containing the ester had to a greater extent the faculty of cutting through oil and grease films than ester free fluxes without the other properties of the fluxes being altered in any substantial manner. This is particularly the case with fluxes containing besides the ester another addition agent which improves the wetting properties and spread of the flux, such as sulfonated mineral oils, as disclosed in my co-pending application, Serial No. 416,759 filed concurrently herewith for: Sulfonated mineral oils as addition agents to zinc chloride base fluxes, filed concurrently herewith or other spreading agents known in this art.

Most of the esters are only soluble to a slight extent in aqueous zinc chloride fluxes. Their solubility is improved if dilute alcohol is used as the solvent for the zinc chloride; but even in straight aqueous fluxes it is sufficient to mix the flux well with the ester before use to obtain the beneficial effect.

My compounded, ester containing zinc chloride fluxes are used in substantially the same manner as ordinary zinc chloride fluxes.

I claim:

1. As a new composition of matter a zinc chloride base flux containing an ester of an aliphatic alcohol.

2. As a new composition of matter a soldering flux comprising zinc chloride and an ester of the general composition R—O—CO—R' in which R is the hydrocarbon radical of an aliphatic alcohol and R' hydrogen or the hydrocarbon radical of a volatile aliphatic acid.

3. As a new composition of matter a zinc chloride base flux containing amyl acetate.

4. As a new composition of matter a soldering flux comprising an aqueous-alcoholic zinc chloride solution and an ester of an aliphatic alcohol.

5. As a new composition of matter a soldering flux comprising zinc chloride solution and amyl acetate.

6. As a new composition of matter a soldering flux comprising an aqueous-alcoholic solution of zinc chloride and amyl acetate.

7. In a process of soft soldering the step of applying a flux comprising zinc chloride and an ester of an aliphatic alcohol.

8. In a process of soft soldering the step of applying a flux comprising zinc chloride and amyl acetate.

9. As a new composition of matter a zinc chloride base flux containing an ester of an aliphatic alcohol and a spreading agent.

10. As a new composition of matter a flux comprising an aqueous-alcoholic solution of zinc chloride, amyl acetate and a spreading agent.

In testimony whereof, I affix my signature.

WILLIAM KENMORE SCHWEITZER.